May 24, 1927. W. H. KELSEY Re. 16,638
MATTRESS AND METHOD OF MAKING THE SAME
Original Filed April 11, 1924 2 Sheets-Sheet 1
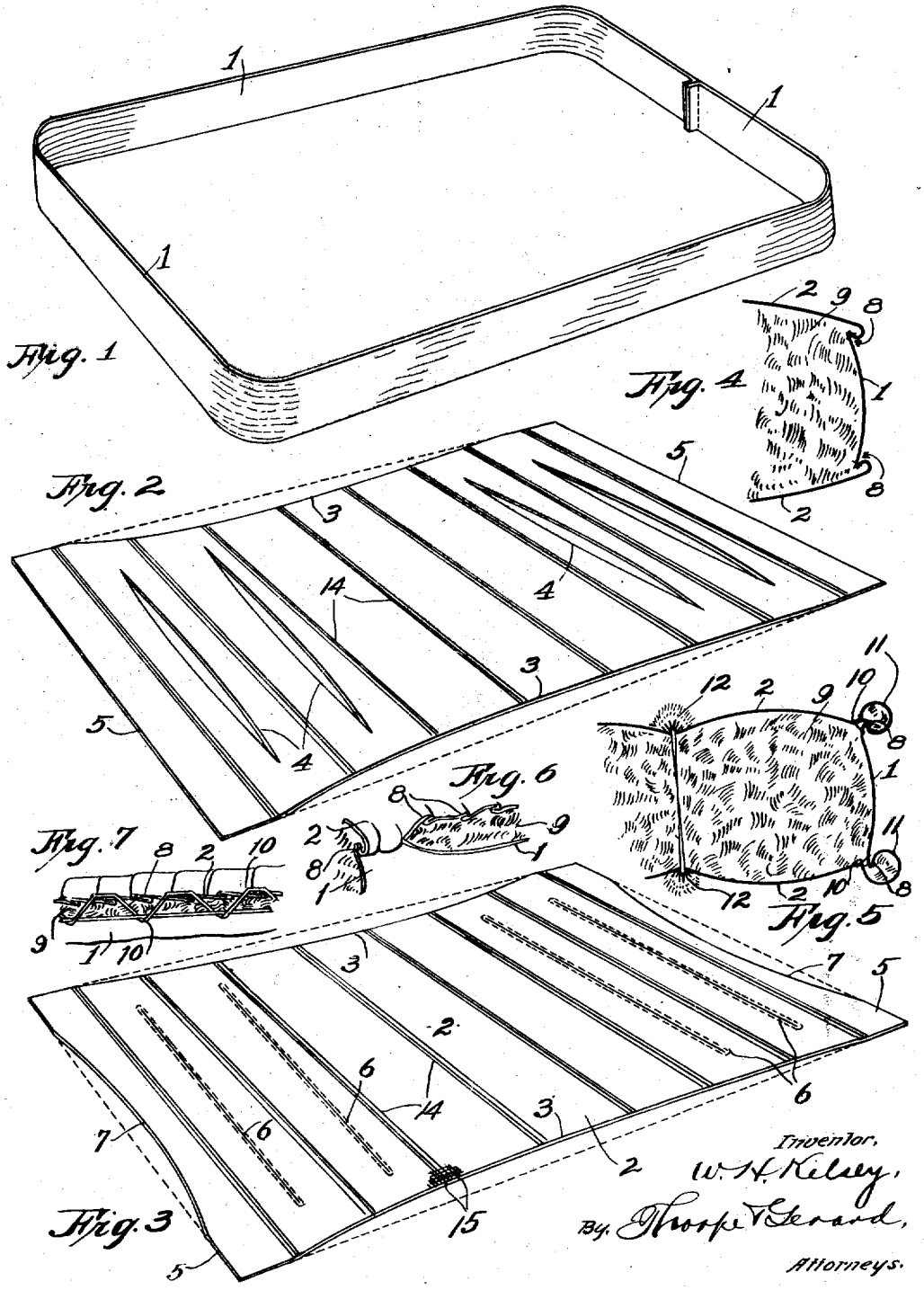

May 24, 1927. W. H. KELSEY Re. 16,638
MATTRESS AND METHOD OF MAKING THE SAME
Original Filed April 11, 1924 2 Sheets-Sheet 2
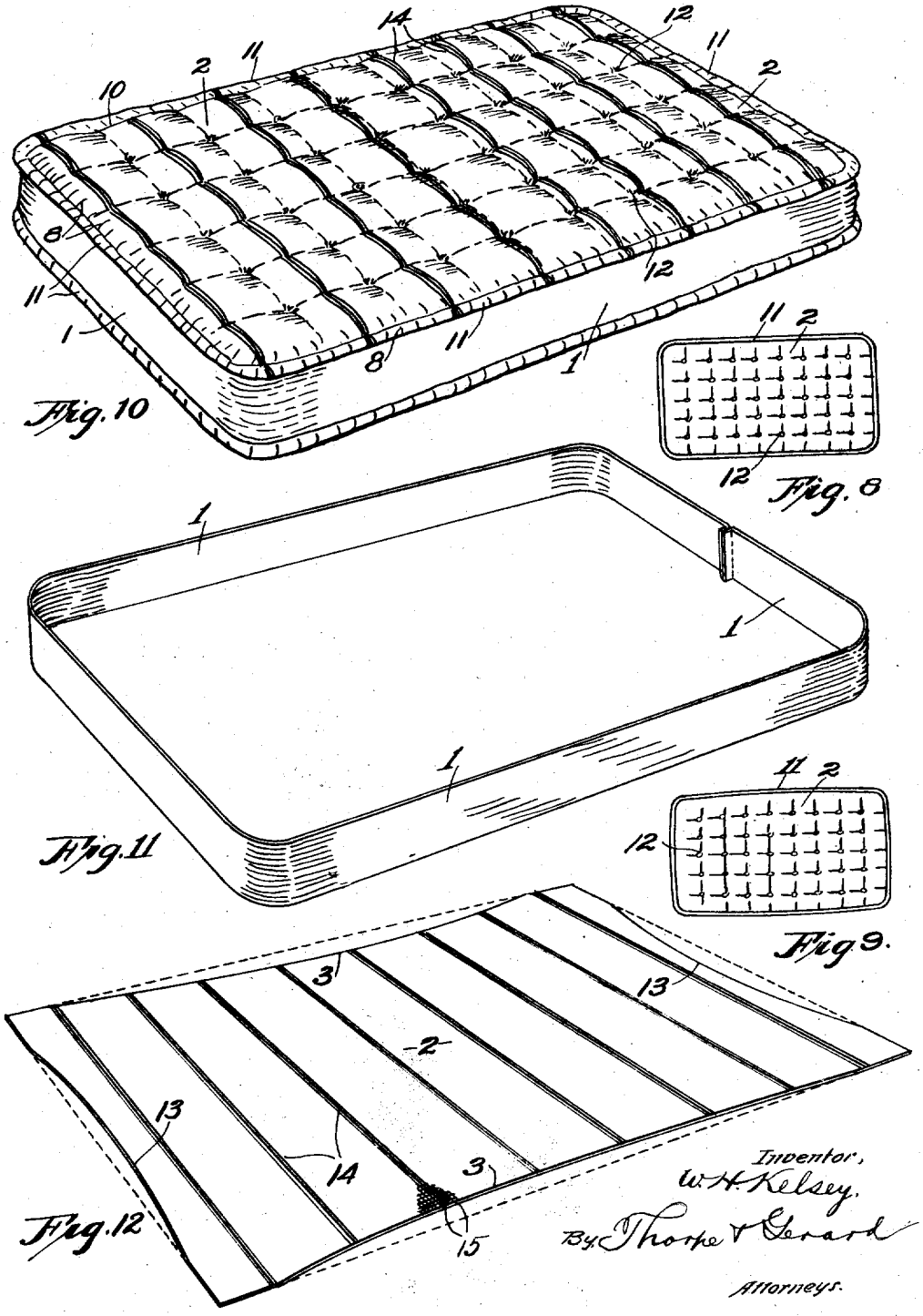
Inventor,
W. H. Kelsey,
By Thorpe & Gerard
Attorneys.

Reissued May 24, 1927. Re. 16,638

UNITED STATES PATENT OFFICE.

WALTER HARRISON KELSEY, OF KANSAS CITY, MISSOURI.

MATTRESS AND METHOD OF MAKING THE SAME.

Original No. 1,559,708, dated November 3, 1925, Serial No. 705,910, filed April 11, 1924. Application for reissue filed October 11, 1926. Serial No. 141,007.

The invention relates to mattresses and has for its object to provide certain new and useful improvements therein due to the practice of a new method of construction, whereby a mattress is provided which is of a stretchless nature and which will not lose its shape.

In the manufacture of mattresses one of the greatest difficulties lies in the arranging and joining of the ticking thereof with relation to the boxing in a manner for preventing great bulging of sides and ends intermediately of the corners. This objectionable feature is commonly present in mattresses now manufactured and when such mattresses stretch and expand they become unsightly and interfere with the desired neat appearance of beds upon which they are used.

Therefore, in its more detailed nature the invention has for its object to provide a stretchless mattress structure and the same is produced by the peculiar method of cutting and joining and arrangement of the ticking with the boxing in a manner whereby stretching and the loss of shape incident thereto are avoided.

With the above and other objects in view the invention further resides in those novel details of construction, combination and arrangement of parts, all of which will be first fully described, then be particularly pointed out in the appended claims, reference being had to the accompanying drawings, in which:—

Figure 1 is a perspective view of the mattress boxing.

Figure 2 is a perspective view of one of the ticking sheets.

Figure 3 is a perspective view of the ticking sheet after the same has been sewn.

Figure 4 is a detail cross section of one corner of the mattress formed by the meeting portions of the ticking and boxing showing the manner in which the same are sewn together.

Figure 5 is a detail cross section similar to Figure 4 showing the mattress corner after the same is completed.

Figure 6 is a detail diagrammatic perspective view illustrating the tucking step of the construction method.

Figure 7 is a detail diagrammatic longitudinal section illustrating the manner of forming the edge rolls.

Figures 8 and 9 are diagrammatic plan views illustrating completed mattresses embodying my invention and common methods respectively, after undergoing a period of use.

Figure 10 is a detail perspective view showing a completed mattress.

Figures 11 and 12 are diagrammatic perspective views illustrating the boxing and ticking sheet features of a modified form of the invention respectively.

In constructing the mattress in accordance with my invention I utilize an open substantially rectangular boxing 1 formed from a strip of suitable material of sufficient length to have the ends thereof sewed together for providing said boxing in the manner clearly indicated in Figure 1 of the drawings.

For cooperating with the boxing in forming the mattress casing, top and bottom ticking sheets 2 are provided, and, in the preferred form of the invention illustrated in Figures 1 to 7 inclusive of the drawings and in Figures 8 and 10, each of said ticking sheets is constructed in the manner clearly illustrated in Figure 2.

The ticking sheets are so formed by utilizing a rectangular sheet of the desired material, the said rectangle being of dimensions slightly in excess of the dimensions of the boxing. For example, if the boxing dimensions cover an area of four feet six inches in width by six feet three inches in length the corresponding ticking dimensions would be in the neighborhood of five feet one inch in width by seven feet two inches in length, thus allowing a surplus of length and width at each end and side for purposes later to be explained. After the rectangular sheet has thus been formed a portion of each side thereof is cut-away on a curved line, from points adjacent the corners thereof, in a manner indicated by the numeral 3 on Figure 2 and elsewhere in the drawings. Portions of the ticking are cut out in a manner for providing transverse curved slits 4, extending substantially parallel to the stripes 14 which in ticking always run with the weave, that is, with the warp threads 15. The ends 5 of the ticking are not cut but remain straight as originally, see Figure 2.

After the transverse slits 4 have been cut as indicated in Figure 2 of the drawings the said slits are sewed together to form seams somewhat in the manner illustrated by the numeral 6 on Figure 3 of the drawings. The sewing together at 6 of the transverse curved slits 4 effects a pulling in of the formerly straight edges 5 so as to cause them to take a curved shape indicated by the numeral 7 on Figure 3, and proportionately corresponding with the curved sides formed by cutting as indicated at 3. It should be understood that both the top and bottom sheets, which cooperate with the boxing 1, are treated as just described in providing the casing for the improved mattress structure which is the subject of my invention.

The edges of the top and bottom ticking sheets, formed as above described, are next tucked and sewed to the edges of the boxing 1 in the manner indicated by the numeral 8 in Figures 4 and 6 of the drawings, and with the seams 6 and stripes 14, and hence the direction of the weave, extending transversely of the mattress; it will be understood, of course, that a portion of one end will be allowed to remain open to permit the proper stuffing of the mattress with any suitable stuffing material indicated by the numeral 9, after which that end will of course be tucked and sewed as were all the remaining edges of the said parts, thus providing what might be termed an over-stuffed mattress having surplus dimensions and not drawn in to its final shape but somewhat oversized as indicated in Figure 4 of the drawings. See Figure 6 for the tucking and sewing feature.

In carrying out the next step in completing the mattress structure the edge materials are taken up along the joining edges of said ticking and the boxing by the heavy thread 10, sewed in zigzag fashion, across the said edge materials, especially the ticking edge material, in a manner for providing the roll 11 which extends around the whole mattress structure at all of the edges thereof. The manner of forming this roll is clearly illustrated in Figure 5 of the drawings. The manner of sewing the thread in forming this roll is clearly illustrated in Figure 7 of the drawings, while Figure 10 illustrates the appearance of the completed product.

After the roll 11 has been formed as just described, the only remaining step necessary to complete the mattress and thus form the structure illustrated in Figure 10 is the sewing of the usual tufts 12 which are suitably sewed and spaced in the manner common in mattress structure and for the purpose of confining the stuffing and providing the desired uniformity of top and bottom mattress surfaces. The tufts 12 at that part of the mattress at which the seams 6 occur may be positioned along said seams, and in this manner the said seams are effectively hidden.

In the manufacture of mattresses much difficulty is occasioned in trying to prevent the mattress from bulging and losing its desired shape, the common fault of such mattresses being indicated diagrammatically in Figure 9. This is due to the fact that the parts of the mattress are merely cut on standard dimensions and without reference to the ticking weave, such that when assembled and the casing to be formed stuffed, the mattress will expand beyond the desired dimensions and, particularly after some use, will distend itself and stretch so as to cause the boxing thereof to bulge out.

By reason of providing specially constructed ticking sheets of the shape illustrated in Figure 3 of the drawings, the mattress casing is provided which, when stuffed, can expand approximately to a predetermined desired dimension as represented in Figure 8, and with the weave or warp threads running transversely it cannot extend itself materially beyond that dimension and therefore will hold its shape more efficiently.

It will be observed from Figures 11 and 12 of the drawings that the same broad purpose of my invention may be accomplished by providing the usual boxing illustrated in Figure 11 and cutting the ticking sheets 2 cooperative therewith, as at 3 and 13, to immediately form the said ticking to the ultimate shape desired without utilization of the transverse slit feature, but nevertheless securing said sheets to the boxing with the weave or warp or most tautly woven threads 15 extending transversely of the mattress, as before. This simpler method may be found practical in the construction of some cheaper types of mattresses, especially those in which plain unstriped material is used. However, I prefer to construct the mattress in accordance with the illustration of Figures 1 to 7, because by so doing a more perfect finished product is produced than would be possible by merely cutting the edges at 3 and 13. By using the transverse slit feature undue distortion of the stripes is prevented, especially where the stripes of the material are positioned to run transversely of the mattress, in which event it would be obvious that to cut out the material to form the curves 7, instead of forming the same by seaming the slits 4, as at 6, would result in the cutting away of a portion of the material so that when the curves 7 would be sewn to the boxing, the distortion would be readily apparent. However, by drawing in the original straight edges 5 by the seams 6 and thus forming the curves 7, the seams 6 being usually positioned to avoid the stripes, all distorted appearance of the mattress is prevented. In either form of the invention, I find that by securing the ticking sheets to the boxing in such a way that the weave or warp or most tautly woven threads of the ticking sheets run transversely or crosswise of the mattress, the sheets will not stretch appreciably crosswise, and hence crosswise stretching of the mattress is practically eliminated.

By reason of tucking the edges of the ticking sheets and sewing them in this condition to the adjacent boxing edges, the surplus of material edge length, made necessary by the provision of the curves at ends and sides, is effectively drawn up so as to pull the material perfectly even around the whole of the mattress and thus provide a uniform and neat appearing structure.

In forming the edge rolls 11 the heavy thread 10 is sewed zigzag through the boxing and ticking material edges, the tacks of the thread at one side being short while those of the other side are relatively long, thus effectively accomplishing the roll forming function and effecting a thread economy. See Figure 7.

In carrying out the preferred form of my invention, the steps of the method are in sequence as illustrated in Figures 1 to 5 inclusive of the drawings, see also Figures 6 and 7.

I have found that the particular tucking feature here disclosed is far superior to pleating or other methods since by the use of such other methods the finished mattress structure is not as smooth and even as the structure made possible by the utilization of this feature of my invention.

From the foregoing description, taken in connection with the accompanying drawings, it is thought that the novel details of construction, the manner of carrying out the invention and the advantages thereof will be readily apparent to those skilled in the art.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

What I claim is:

1. In a mattress, a substantially rectangular boxing, ticking adapted to be secured to the boxing to form the mattress casing, and stuffing for filling the mattress casing, the said ticking having curves at the sides and ends thereof.

2. In a mattress, a substantially rectangular boxing, ticking adapted to be secured to the boxing to form the mattress casing, and stuffing for filling the mattress casing, the said ticking being shaped on a curve at each of the sides and ends, which curves extend inwardly from points adjacent each corner.

3. In a mattress, a substantially rectangular boxing, ticking adapted to be secured to the boxing to form the mattress casing, stuffing for filling the mattress casing, the said ticking being of a dimension in excess of the dimension of the boxing and being formed with reduced side and end portions and having the edges tucked, and edge rolls surrounding the mattress at the edges thereof, and formed by sewing through the ticking and boxing material adjacent the joined edges thereof.

4. In a mattress, a substantially rectangular boxing, ticking adapted to be secured to the boxing to form the mattress casing, and stuffing for filling the mattress casing, the said ticking being shaped on a curve at each of the sides and ends, which curves extend inwardly from points adjacent each corner, and being tucked and being of dimensions in excess of those of the boxing to permit the provision of the ticking curve feature, and edge rolls surrounding the mattress at the edges thereof and formed by sewing through the ticking and boxing material adjacent the joined edges thereof.

5. In a mattress, a substantially rectangular boxing, ticking adapted to be secured to the boxing to form the mattress casing, and stuffing for filling the mattress casing, the said ticking having concaved sides and seams formed transversely thereof to form concaved ends.

6. In a mattress, a substantially rectangular boxing, ticking adapted to be secured to the boxing to form the mattress casing, and stuffing for filling the mattress casing, the said ticking being of a dimension in excess of the boxing and being formed with concaved sides and ends and having the said concaved edges tucked, and edge rolls surrounding the mattress at the edges thereof and formed by sewing through the ticking and boxing material adjacent the joined edges thereof.

7. In a mattress, a substantially rectangular boxing, ticking adapted to be secured to the boxing to form the mattress casing, and stuffing for filling the mattress casing, the said ticking having concaved sides and seams formed transversely thereof to form concaved ends, the said concaved ends and sides being tucked, and being of dimensions in excess of those of the boxing to permit the provision of the ticking concave feature, and edge rolls surrounding the mattress at the edges thereof and formed by sewing through the ticking and boxing material adjacent the joined edges thereof.

8. In a mattress, a substantially rectangular boxing, ticking adapted to be secured to the boxing to form the mattress casing, and stuffing for filling the mattress casing, the said ticking having concaved sides and seams formed transversely thereof to form concaved ends, and tufts sewed to and through the ticking and stuffing to shape the mattress top and bottom, those of the tufts adjacent the transverse seams being positioned along the said seams to render the said seams inconspicuous.

9. In a mattress, a substantially rectangular boxing, ticking adapted to be secured to the boxing to form the mattress casing, and stuffing for filling the mattress casing, the said ticking having concaved sides and seams formed transversely thereof to form concaved ends, the said concaved ends and sides being tucked, and being of dimensions in excess of those of the boxing to permit the provision of the ticking concave feature, edge rolls surrounding the mattress at the edges thereof and formed by sewing through the ticking and boxing material adjacent the joined edges thereof, and tufts sewed to and through the ticking and stuffing to shape the mattress top and bottom, those of the tufts adjacent the transverse seams being positioned along the said seams to render the said seams inconspicuous.

10. In a mattress, a substantially rectangular boxing, striped ticking adapted to be secured to the boxing to form the mattress casing with the weave of the ticking running crosswise of the mattress, and stuffing for filling the mattress casing, the said ticking having curves at the sides and ends thereof.

11. In a mattress, a substantially rectangular boxing, ticking adapted to be secured to the boxing to form a mattress casing, said ticking having the weave running crosswise of the mattress, and stuffing for filling the casing, said ticking having concave sides and seams formed transversely thereof to constitute curved ends.

WALTER HARRISON KELSEY.